Figure 1:
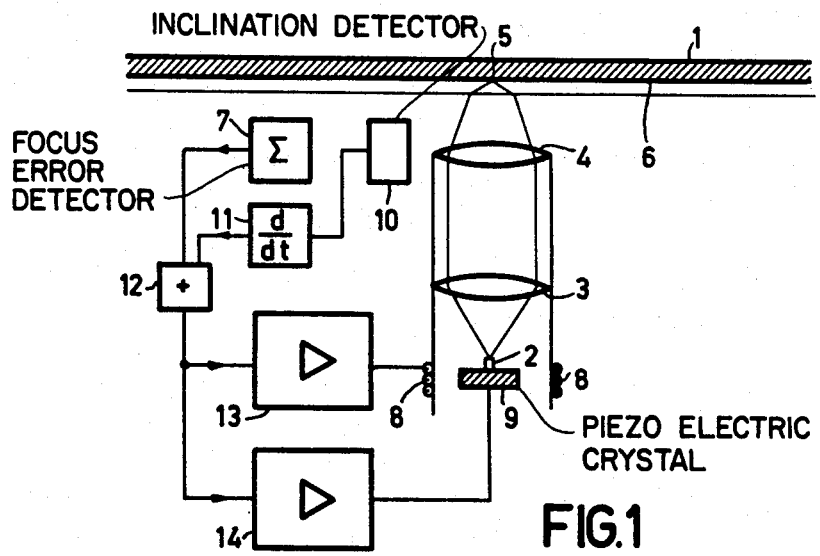

United States Patent [19]
Van Rosmalen et al.

[11] 4,374,324
[45] Feb. 15, 1983

[54] OPTICAL FOCUSSING DEVICE WITH INCLINATION DETECTION

[75] Inventors: Gerard E. Van Rosmalen; Willem G. Opheij, both of Eindhoven, Netherlands

[73] Assignee: U.S. Philips Corporation, New York, N.Y.

[21] Appl. No.: 205,554

[22] Filed: Nov. 10, 1980

[30] Foreign Application Priority Data

Sep. 2, 1980 [NL] Netherlands .......................... 8004969

[51] Int. Cl.³ .............................................. G01J 1/20
[52] U.S. Cl. ...................................... 250/201; 369/44; 369/45
[58] Field of Search ........................ 250/201, 204, 570; 369/44, 45, 43, 46

[56] References Cited

U.S. PATENT DOCUMENTS 3,932,700  1/1976  Snopko .............................. 250/201
4,301,527  11/1981  Tsonoda et al. ...................... 369/45

*Primary Examiner*—David C. Nelms
*Attorney, Agent, or Firm*—Thomas A. Briody; Robert T. Mayer; Algy Tamoshunas

[57] ABSTRACT

In order to improve the focussing of radiation from a source onto an object, in example for a "VLP" or "Compact Disk" system, a further control signal from an object-inclination detector is added to the focussing error signal, yielding improved control stability and smaller focussing errors.

3 Claims, 3 Drawing Figures

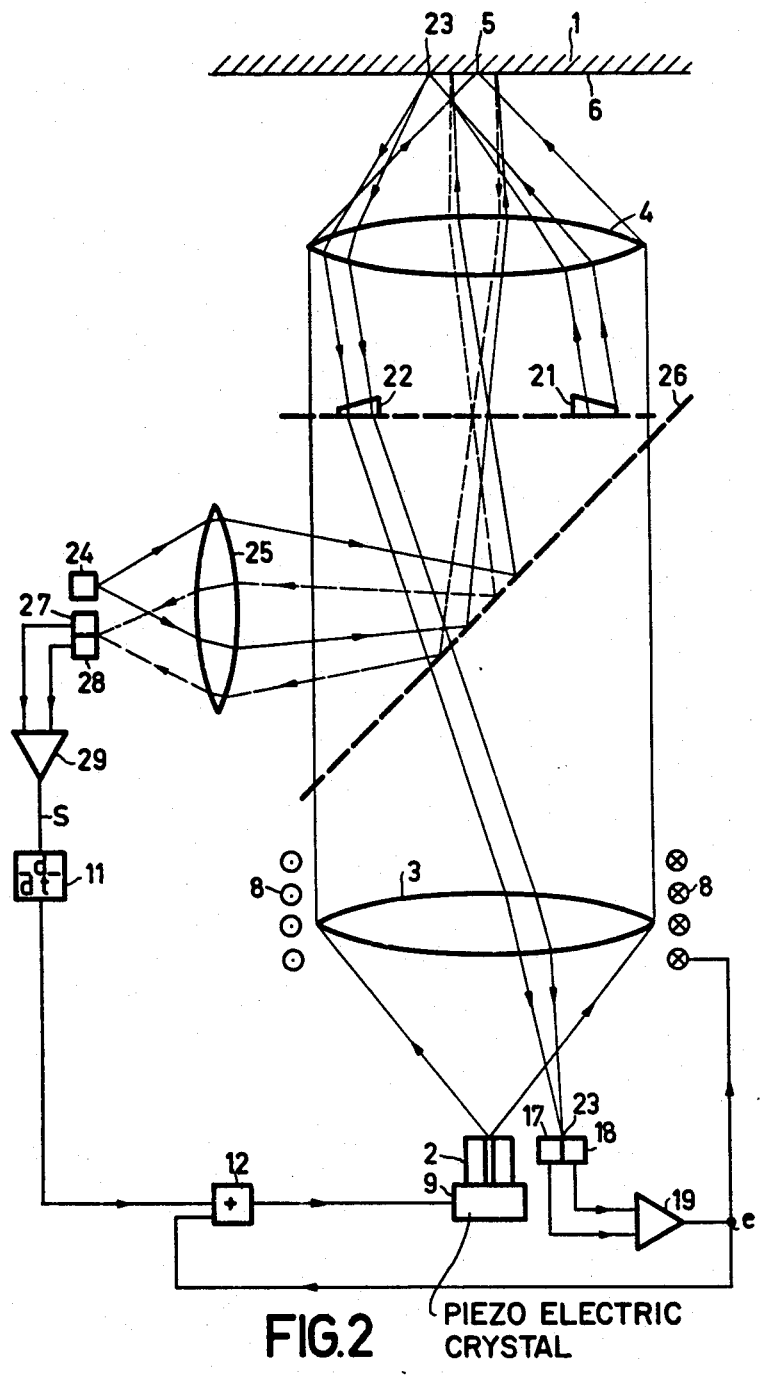
FIG.2 PIEZO ELECTRIC CRYSTAL

OPTICAL FOCUSSING DEVICE WITH INCLINATION DETECTION

The invention relates to an optical focussing device, comprising a radiation source, focussing means for focussing the radiation from the radiation source at an object, detection means for detecting the focussing error and control means, which move the radiation source and/or the focussing means, or at least parts thereof, relative to the object so as to reduce the focussing error.

Devices of this type are inter alia employed for reading optically encoded information on an information carrier, as in the optical video disk and audio disk systems described in the literature by the names of "VLP" and "Compact Disk".

A device of the type mentioned in the opening paragraph is known from German Patent Application No. 2,619,232. In said device the control means act on two parts of the optical system, comprising the radiation source and the focussing means, the one part being capable of performing comparatively slow movements and the other part comparatively rapid movements, in order to obtain a high control speed (limit frequency). The control signal is then applied to both parts in a feedback sense, but in practice this presents substantial technical problems in realizing a stable control.

It is the object of the invention to provide a device of the type mentioned in the opening paragraph, in which a different solution is adopted for said control problem. The invention is characterized in that, in addition to the focussing error detection means, there is provided an object-inclination detector. The inclination detector supplies a further control signal which depends on the local inclination of the object relative a plane normal to the optical axis of the focussing means. The further control signal is then applied to the control means together with that from the focussing error detection means.

The invention is based on the recognition that the signal supplied by the inclination detector improves the control stability, on the one hand, because said signal is independent of the control loop which includes the focussing error detection means and the control means, and, on the other hand, because the focussing error detection means now need supply a smaller signal for focussing the radiation source at the object.

Figure 3:
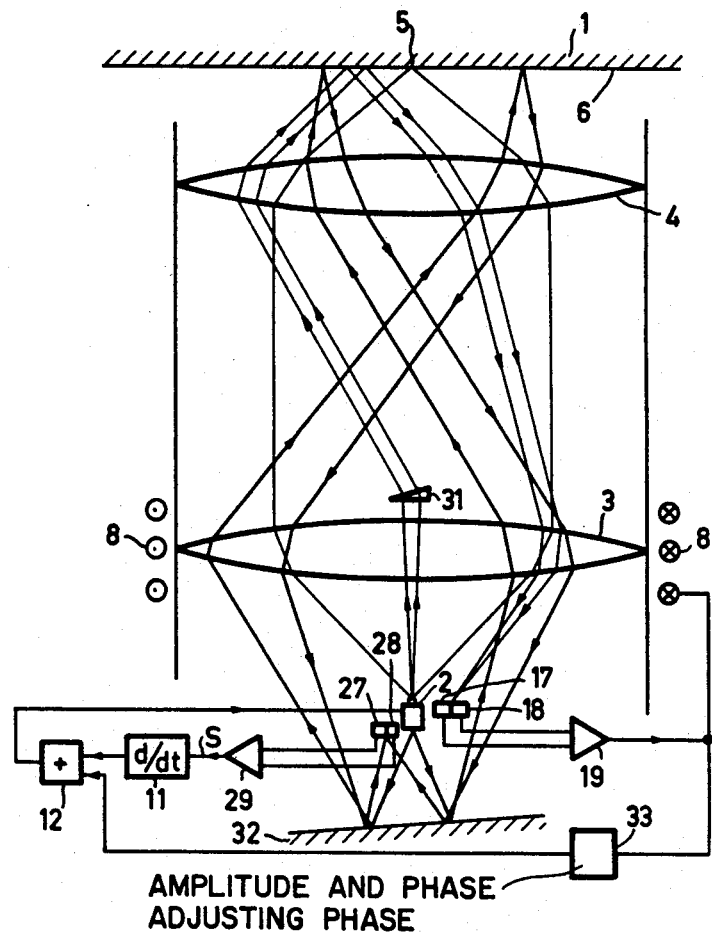

The invention will be described in more detail with reference to the drawing, in which FIG. 1 represents the principle in schematic form, FIGS. 2 and 3 represent two embodiments of the invention.

In FIG. 1 the reference numeral 1 designates a carrier of optically coded information, for example an optical video disk ("VLP") or an optical audio disk. Said information can be read in known manner by means of a radiation source 2, specifically a laser, whose radiation is focussed at the carrier 1 by means of a lens system 3, 4. An electric signal is derived from the reflected radiation upon detection, which signal corresponds to the information on the carrier 1. Furthermore, many methods are known of obtaining a signal which is a measure of the focussing error, that is the distance between the image point 5 of the source 2, which is imaged on the carrier 1 by the lens system 3, 4 and the layer 6 on said carrier, which contains the information in optically coded form. The reference numeral 7 schematically represents a detector, which supplies an electric signal corresponding to the focussing error, the so-called error signal.

In the aforementioned German Patent Application No. 2,619,232 said error signal (after being amplified) is applied to two control elements 8 and 9 in a negative feedback. One control element (8) is adapted to produce only comparatively slow displacements of the image point 5, while the other element (9) is adapted to provide a fast displacements such that the desired limit frequency of the control device can be attained. Schematically the control element 8 is represented as an electrodynamic coil, which is capable of moving the entire lens system 3, 4 in the direction of the optical axis, while the element 9 may be a piezoelectric crystal, which is capable of moving the radiation source 2, for example a diode laser, in the direction of the optical axis; however, from the following it will be apparent that it is also possible to employ a single control element or other combinations of control elements.

According to the invention, there is provided, in addition to the focussing error detector, an inclination detector, by means of which the local inclination of the information carrier 1 relative to a plane perpendicular to the optical axis of the focussing means, specifically the lens system 3, 4 is detected. Such an inclination detector, which is based on optical principles, is known per se from "Neues aus der Technik" of December 1976, page 3. The inclination detectors shown in FIGS. 1 and 2 have a slightly different construction, which is particularly suitable for incorporation in a video disk or audio disk player.

In the diagram of FIG. 1 the inclination detector is schematically represented by 10. Its output signal is applied to a differentiating network 11 and is subsequently added to the error signal supplied by the focussing error detector in an adder stage 12. At a given velocity v of the information carrier 1 relative to the read system 2, 3, 4, it is theoretically possible to adjust the amplifier 13 and 14 in such a way that the movements to which the lens system 3, 4 and the radiation source 2 and thus the image point 5 are subjected by the control means 8 and 9 solely in response to the signal supplied by the inclination detector 10 would exactly follow the movements of the information layer 6. If, for example, the carrier 1 has a bulge, so that the information layer would come nearer to the read system 2, 3, 4 by a distance x, the inclination detector 10 will supply a signal proportional to (dx/vdt). After differentiation in the stage 11 a control signal is thus obtained which, assuming that the velocity v is constant, is proportional to $(d^2x/dt^2)$. In the case of a correct adjustment of the proportionality factor, the force which is consequently exerted on the control means 8 and 9 will just be capable of providing the required displacement x of the image point 5. By combining said forward control with the usual control by means of the focussing error detector 7, by means of which focussing errors (for example as a result of an inaccurate adjustment of said proportionality factor, and non-ideal properties of the differentiating network 11) are reduced, residual focussing errors will be eliminated, which moreover yields the advantage that the control already becomes operative long before the inclination detector (which is then only operative within a limited range) becomes active.

Generally the control means 8 will respond more slowly than the control means 9, because said first-mentioned means moves the entire lens system 3, 4, while the second means need only move the comparatively light-weight source 2. In practice, the output signal of the inclination detector 10 will therefore, be applied to the rapidly responding corresponding control means 9 in a feed-forward sense, while the output signal of the focussing error detector 7 will be applied both to the slowly responding control means 8 in a feedback sense and in a feedback or feed-forward sense to the rapidly responding control means 9. A control system with various arrangements for producing comparatively slow and rapid movements of the focussing means and radiation source is described, for example, in U.S. Application Ser. No. 207,117, filed Nov. 17, 1980.

FIG. 2 represents an embodiment, in which the aforementioned principles are further elaborated. The information in the layer 6 of the information carrier 1 is again scanned by means of the radiation from the source 2, for example a laser diode, which is focussed at the layer 6 by means of the lens system 3, 4 (focus 5). A portion of the radiation is intercepted by a wedge 21, is reflected by the information carrier 6 as a narrow almost parallel beam and subsequently returns to the collimator lens 3 via a wedge 22. The collimator lens 3 projects the beam at two push-pull photodiodes 17, 18. If the information layer 6 is situated before or behind the focus 5, the reflection point 23 of the diverted beam will move sideways, so that either the diode 17 or diode 18 receives more radiation and via the push-pull amplifier 19 a signal e is supplied which is a measure of the focussing error between the focus 5 and the information layer 6. Such a method of determining the focussing error is described in U.S. Pat. No. 4,135,207.

The local inclination of the information layer 6 in the vicinity of the focussed radiation relative to the optical axis of the lens system 3,5, is detected with the use of an auxiliary radiation source 24, for example, a light-emitting diode (LED) having a different radiation wavelength than that of the radiation of the source 2. The radiation of said source 24 is directed at a color-sensitive mirror 26 via a lens 25, which mirror acts as a mirror for the wavelength of this radiation, but is transparent to that from the source 2. After passing the objective lens 4 the radiation from source 24 is incident on the information carrier 1 as a substantially parallel beam. The beam is reflected by the information layer 6, returns via the lens 4, the mirror 26 and the lens 25 and is incident on two photodiodes 27 and 28 which are connected in push-pull.

If the information layer 6 is not perfectly perpendicular to the optical axis of the lens system 3, 4 and instead is inclined to the left or to the right, a greater part of the returning beam will be incident on the photodiode 28 or the photodiode 27, so that via a push-pull amplifier 29 an inclination-detector signal "s" is produced. In the differentiating stage 11, signal "s" is differentiated and subsequently added to the focussing error signal e in the adder stage 12, after which it reaches the control element 9, by means of which the radiation source 2 can be moved to and fro in the direction of the optical axis. Moreover, the signal e reaches the control element 8, with the aid of which the lens system can be moved in a similar way. The signal e is applied to the control elements 8 and 9 in a negative feedback sense, while the signal s is applied to the control element 9 in a feed-forward sense, the correct magnitude of said signal s being adjustable with the amplifier 29.

In the embodiment of FIG. 3 the radiation from the source 2 is again focussed at the information carrier 1 with the aid of the lens system 3, 4, so that an image point 5 is obtained by means of which the information on the carrier 1 can be read. A part of the radiation from the source 2 around the optical axis of the system 3, 4 is diverted by means of a wedge 31 and then reaches the carrier 1 via the lens 4, again traverses lens 4 and subsequently the lens 3, and is then incident at the photodiodes 17, 18, which again provide the focussing error signal e via the push-pull amplifier 19.

For generating the inclination-detector signal s use is made of the radiation which is radiated from the back of the source 2, for example a laser diode. Said radiation is reflected by a slightly tilted mirror 32, then passes through the lenses 3 and 4, after which it is reflected by the information layer 6 of the carrier 5 as a substantially parallel beam and subsequently reaches the two photodiodes 27, 28 via the lenses 4 and 3 and the mirror 32. If the carrier 1 is inclined relative to the plane normal to the optical axis of the system 3, 4, either the diode 27 or the diode 28 will receive more radiation, so that via the push-pull amplifier 29 a signal s is obtained, which is a measure of the inclination. Via the adder circuit 12, the signal e is added to the differentiated signal s and subsequently the resulting signal is applied to the control element in a feed-forward sense, which element 9 can move the source 2 in the direction of the optical axis. By the inclusion of the stage 33 the amplitude and phase of the signal e can be adjusted so that a most accurate compensation for the focussing error is obtained, in which respect it is to be noted that the signal e is substantially independent of the movements to which the source 2 is subjected by the control means 9.

The signal e, however, is applied to the control element 8 in a negative feedback sense, by means of which element the slower and larger focussing errors are reduced.

What is claimed is:

1. An optical focussing device comprising a radiation source, means for focussing radiation from said source onto an object, means for detecting a focussing error and providing a first signal representative of said focussing error, means for detecting a local inclination of the object relative to a plane normal to an optical axis of said focussing means, said inclination detecting means producing a second signal representative of said inclination, and control means responsive to said first and second signals for moving at least one of said source, focussing means or parts thereof relative to the object so as to reduce the focussing error.

2. The device according to claim 1 wherein said control means includes first means responsive to said first signal for moving said focussing means in a direction parallel to said optical axis and second means responsive to said first and second signals for moving said source in a direction parallel to said optical axis.

3. The device according to claim 2 including means coupled to said inclination detecting means for differentiating said second signal, means coupled to said focus error detecting means and said differentiating means for adding said first signal and said second signal which has been differentiated by said differentiating means to obtain a sum signal, and means for applying said sum signal to said second means.

* * * * *